(12) United States Patent
Sable et al.

(10) Patent No.: US 12,547,384 B2
(45) Date of Patent: Feb. 10, 2026

(54) WEB APPLICATION TELEMETRY

(71) Applicant: ServiceNow, Inc., Santa Clara, CA (US)

(72) Inventors: Kapeel Sharadrao Sable, Nagpur (IN); Jason Strimpel, San Diego, CA (US); Wolfgang David Wedemeyer, San Diego, CA (US); Sean Andrew Bradley Bowrin, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 282 days.

(21) Appl. No.: 18/428,618

(22) Filed: Jan. 31, 2024

(65) Prior Publication Data

US 2025/0244974 A1 Jul. 31, 2025

(51) Int. Cl.
 G06F 8/38 (2018.01)
 G06F 8/20 (2018.01)
 H04L 67/02 (2022.01)

(52) U.S. Cl.
 CPC .................. G06F 8/38 (2013.01); G06F 8/20 (2013.01); H04L 67/02 (2013.01)

(58) Field of Classification Search
 CPC ........................................................ G06F 8/38
 USPC ........................................................ 715/762
 See application file for complete search history.

(56) References Cited

U.S. PATENT DOCUMENTS

| | | | | |
|---|---|---|---|---|
| 8,161,386 B1 * | 4/2012 | Mark | ...................... | G06F 9/453 715/708 |
| 11,233,802 B1 * | 1/2022 | Rudeanu | ............. | H04L 63/0435 |
| 11,775,263 B2 * | 10/2023 | Mabote | ..................... | G06N 5/04 715/762 |
| 11,972,275 B1 * | 4/2024 | Weibel | .................... | G06F 9/451 |
| 2004/0064437 A1 * | 4/2004 | Knopf | ..................... | G06F 16/21 |
| 2005/0251298 A1 * | 11/2005 | Gvillo | ........................ | G06F 8/30 701/3 |
| 2008/0282175 A1 * | 11/2008 | Costin | ................... | G06F 16/972 715/760 |
| 2011/0197136 A1 * | 8/2011 | Duke | .................... | G06F 16/958 707/769 |
| 2015/0039942 A1 * | 2/2015 | Che | ..................... | G06F 11/3612 714/38.1 |
| 2016/0170567 A1 * | 6/2016 | Hunter | ................... | G06F 11/32 715/762 |
| 2017/0250855 A1 * | 8/2017 | Patil | ...................... | H04L 41/064 |
| 2018/0007118 A1 * | 1/2018 | Loza | ....................... | G06F 9/505 |
| 2018/0335940 A1 * | 11/2018 | Beerana | ..................... | G06F 8/38 |
| 2020/0050431 A1 * | 2/2020 | Zilouchian Moghaddam | ............ | G06F 8/38 |

(Continued)

*Primary Examiner* — Reza Nabi
(74) *Attorney, Agent, or Firm* — McDonnell Boehnen Hulbert & Berghoff LLP

(57) ABSTRACT

A specification of a user interface for a development of a web application is received. Program components to be executed by a client to load the user interface of the web application are identified. Metadata associated with the identified program components is stored in a database. Webpage computer code to be executed by the client to load the user interface is generated, wherein execution of the webpage computer code results in determining, based on the generated webpage computer code, satisfaction of an achievement of a threshold loading state, wherein the threshold loading state characterizes the user interface executing on the client based on execution progresses of the program components. The webpage computer code is provided to the client.

20 Claims, 16 Drawing Sheets

(56) References Cited

U.S. PATENT DOCUMENTS

| | | | | |
|---|---|---|---|---|
| 2020/0396304 | A1* | 12/2020 | Webber | G06F 11/302 |
| 2021/0216190 | A1* | 7/2021 | Vakil | G06F 16/953 |
| 2021/0314342 | A1* | 10/2021 | Oberg | H04L 63/20 |
| 2022/0174012 | A1* | 6/2022 | Deshmukh | H04L 67/1097 |
| 2022/0222117 | A1* | 7/2022 | Kutch | G06F 9/5005 |
| 2023/0107316 | A1* | 4/2023 | Ripa | G06V 30/10 |
| | | | | 700/29 |
| 2023/0185696 | A1* | 6/2023 | Kroehling | G06F 8/77 |
| | | | | 717/130 |
| 2024/0169088 | A1* | 5/2024 | Neelappa | G06F 21/6227 |
| 2025/0045340 | A1* | 2/2025 | Cirone | G06F 11/3476 |
| 2025/0173241 | A1* | 5/2025 | Cirone | G06F 11/3466 |
| 2025/0181320 | A1* | 6/2025 | Siddiqi | G06F 8/38 |
| 2025/0244974 | A1* | 7/2025 | Sable | G06F 8/20 |
| 2025/0247313 | A1* | 7/2025 | Ford | H04L 43/06 |

\* cited by examiner

WEB APPLICATION TELEMETRY

BACKGROUND OF THE INVENTION

A web application typically utilizes a client-server architecture with a web application server portion that is accessed by a client portion using a browser application. A web application can provide dynamic functionality that is accessible via an interactive graphical user interface. Example functionality offered by web applications include email services, information technology management services, online document editors, etc. Due to their reliance on a client-server architecture, aspects of both the client, the server, and the underlying computer network among other factors influence a web application's performance.

BRIEF DESCRIPTION OF THE DRAWINGS

Various embodiments of the invention are disclosed in the following detailed description and the accompanying drawings.

FIGS. 13A-D are diagrams illustrating portions of example component metadata.

DETAILED DESCRIPTION

Figure 1:
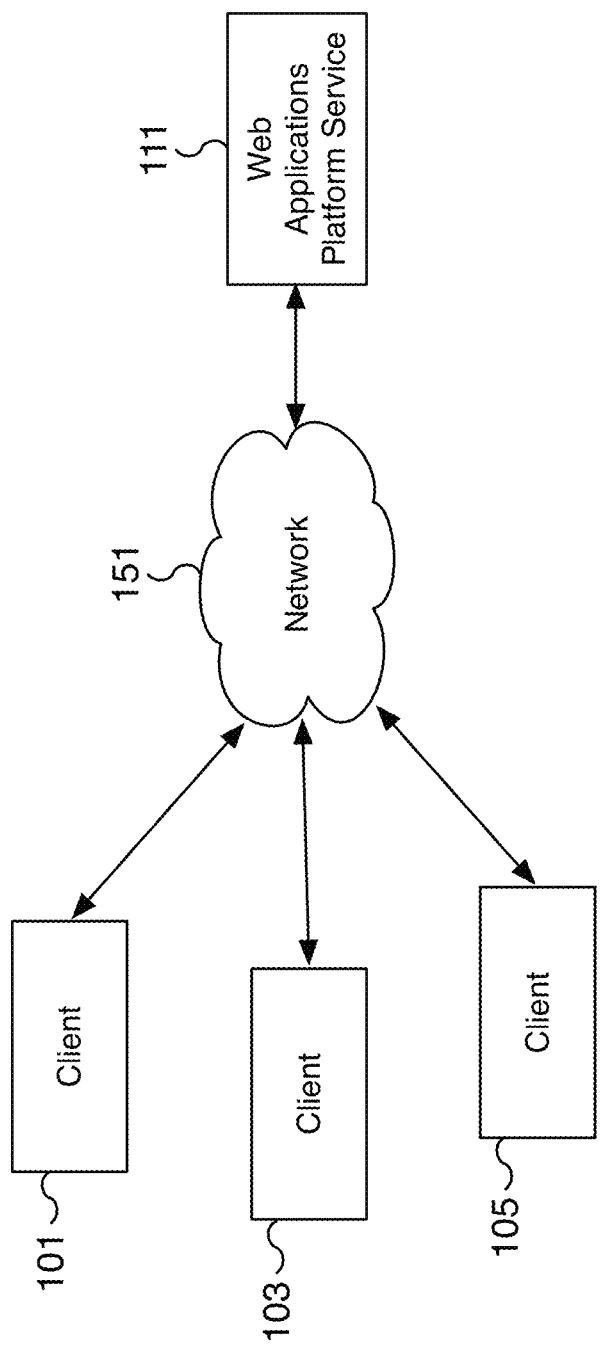
FIG. 1 is a block diagram illustrating an embodiment of a web applications system architecture that provides web application telemetry information.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Web application telemetry for web applications is disclosed. For example, using the disclosed techniques and framework, telemetry information including page load times for a web application can be accurately captured. In various embodiments, the disclosed techniques allow for tracking the performance of web applications designed using a customizable graphical user interface builder. The user interface and corresponding functionality of the web application can be created using reusable and modular components. For example, when designing a web application using the disclosed techniques, developers can utilize existing components and/or newly created reusable and modular components. The utilized components are linked together along with their corresponding functionality and presentation configuration to create a web application whose performance can be accurately measured. For example, a web application can be configured to utilize one or more different presentation formats such as a single column, double column, triple column, a page with a left-side panel, a page with a right-side panel, a page with two side panels, and/or another presentation format. Additional presentation formats and/or behavior, such as a grid and/or adaptive layout formats and behaviors, can be configured as well. The included components used by the web application can be sourced from a component library allowing for reusability and scaling. Example components can include an action bar, an activity stream, an agent inbox, an agent chat, an alert, an analytics key performance indicator (KPI), an audio player, and a button, among other components.

When configuring the custom web application, the components can be configured with one or more properties such as prioritization and loading properties. For example, the utilized components in a web application can be configured with different priority parameters that determine their order and/or priority when loading the web application. In some embodiments, higher priority components are loaded first while components with low, non-critical, and/or on-demand priority configurations can be loaded last and/or loaded only when needed. By configuring components and providing optional priority parameters, when a web application is accessed via a browser, the components can be loaded in an intelligent, measurable, and optimized manner.

In some embodiments, the order the components of a web application are loaded and/or their execution is deterministic and can be accurately profiled. For example, telemetry information such as page load time can be reliably and deterministically measured by evaluating the load/execution status of included web application components. In some embodiments, the components within a web application page are identified and then retrieved. The retrieval process can be configurable based on priority and/or other loading parameters, such as an on-demand parameter. Once required components are retrieved, the activity and/or pending tasks associated with the identified components are evaluated. Telemetry information related to the page including page load time, page access time, page latency, etc. can be measured based on the evaluation of components. For example, a page load time can be evaluated when all prioritized component tasks have completed their execution.

In some embodiments, the measurable telemetry information is accessible via an application programming interface (API) such as a JavaScript API provided by the web applications platform service hosting the associated web application. For example, a telemetry API can expose functionality that allows the web application to determine telemetry information and report the determined information to the web applications platform service. Once the telemetry information is provided to the web applications platform service, the telemetry information, such as benchmark times, resource utilizations, measured timestamps, etc. can be further processed and accessed, such as via a telemetry dashboard, log files, telemetry database entries, etc. In some embodiments, the telemetry API includes the ability to trigger events, such as a page load complete event and/or a page idle event. For example, once a web application page has completed loading, the associated page load time is measured and reported, and a page idle and/or page load complete event can be triggered. The initiated event can be used to launch additional processing such as loading non-essential page components.

In some embodiments, a specification of a user interface for a development of a web application is received. For example, a web application is designed using a customizable user interface builder. The specifications for the web application such as the components to utilize and their corresponding configurations are received. Configured component parameters can include configurations related to component load and/or execution priority, component resource utilization schemes, component event triggers, etc. In some embodiments, program components to be executed by a client to load the user interface of the web application are identified. For example, the components used by the web application, which can be reusable and modular components shared by other web applications, are identified. The components may be sourced from a shared component library and can be identified by an assigned unique identifier. In some embodiments, metadata associated with the identified program components are stored in a database or another data store. For example, once the components are identified, metadata describing the components including which components are utilized and their configuration parameters is stored. By storing the metadata for page components, the components can be later retrieved when the component-based web application and its component metadata are accessed.

In some embodiments, webpage computer code to be executed by the client to load the user interface is generated. For example, webpage computer code such as client JavaScript code is generated based on and to implement the designed web application. The generated computer code can include code for linking the components based on their desired configuration such as their presentation layout format and can include and/or reference associated page functionality such as a scheduler for loading the components and/or telemetry calls for measuring and/or accessing telemetry information. In some embodiments, the execution of the webpage computer code results in determining, based on the generated webpage computer code, satisfaction of an achievement of a threshold loading state. For example, the webpage computer code can include calls to a telemetry application programming interface and a scheduler for measuring the status of a loading state of the web application and when the loading state is complete. In some embodiments, the loading state corresponds to loading one or more web application pages and the satisfaction of an achievement of a threshold loading state corresponds to completely loading the components of the corresponding web application pages and/or executing any tasks associated with the components. In various embodiments, the threshold loading state characterizes the user interface executing on the client based on execution progresses of the program components. For example, the threshold loading state can correspond to when the web application has completed the loading and execution of its required components and is now idle and ready to process user input.

In some embodiments, the execution of the webpage computer code further results in identifying a listing of the program components to be executed by the client by obtaining the metadata from the database. For example, the generated code includes processing and telemetry functionality that identifies the required components of application based on the saved metadata for the web application. Based on the list of identified components, requested telemetry information related to the web application and its components, such as the satisfaction of the achievement of the threshold loading state, can be determined and provided. In some embodiments, the satisfaction of the achievement of the threshold loading state is detected using a code execution scheduler. For example, a client-based scheduler can load and execute the required web application components. The scheduler can also provide access to the components and their current execution states. In some embodiments, the code execution scheduler is provided via the generated webpage computer code. For example, the scheduler is a client-side scheduler that is incorporated and/or referenced by the generated webpage computer code for the web application. In some embodiments, the generated webpage computer code is provided to the client. For example, the generated webpage computer code can be pre-generated and/or generated dynamically when the corresponding application is accessed. The corresponding generated code is made available and provided to the client for execution when the web application is accessed.

FIG. 1 is a block diagram illustrating an embodiment of a web applications system architecture that provides web application telemetry information. In the example shown, clients 101, 103, and 105 are network clients configured to access and utilize web applications designed and/or hosted by web applications platform service 111. Clients 101, 103, and 105 are communicatively connected to web applications platform service 111 via network 151. Network 151 can be a public or private network. In some embodiments, network 151 is a public network such as the Internet. Web applications platform service 111 provides a cloud-based service to design and host web applications and to further provide telemetry information related to its hosted web applications. For example, telemetry information for web applications offered by web applications platform service 111 when accessed by clients 101, 103, and 105, such as page load times, can be accurately captured. The captured telemetry information can be provided and used to optimize the performance and/or functionality of the corresponding web application.

In some embodiments, clients 101, 103, and 105 are each a network client device for running cloud or web-based applications including Software-as-a-Service (SaaS) applications hosted by web applications platform service 111. For example, each of clients 101, 103, and 105 is configured with a browser to access web applications provided by web applications platform service 111. In various embodiments, a communication channel can be established between web applications platform service 111 and each of clients 101, 103, and 105 to access the hosted web applications. In some embodiments, the clients 101, 103, and 105 are further utilized to create the corresponding web applications and to manage them including to monitor and/or evaluate measured telemetry information. For example, clients 101, 103, and 105 can access a web application builder for creating a web application and to instrument the application to capture and report telemetry information.

In some embodiments, web applications platform service 111 is a cloud server that offers functionality for building and hosting a web application whose telemetry information can be accurately captured. The provided graphical user interface builder can allow a developer to utilize reusable and modular components when creating a web application. Additionally, web applications platform service 111 provides a telemetry framework and service that allows telemetry information related to a created web application to be captured and reported back to web applications platform service 111. The webpage computer code generated for the created web application includes references to the utilized components and any telemetry information requests. In some embodiments, web applications platform service 111 further provides the captured telemetry information to users such as via a telemetry dashboard, log files, database entries, and/or another format. The provided telemetry information can be used by the developer to further improve the performance of the created web application.

Although single instances of some components have been shown to simplify the diagram of FIG. 1, additional instances of any of the components shown in FIG. 1 may exist. For example, web applications platform service 111 may include one or more cloud servers and one or more databases utilized by the cloud servers. Additionally, clients 101, 103, and 105 are example client devices for accessing and utilizing the services of web applications platform service 111. Although three clients are shown (clients 101, 103, and 105), many more additional clients can exist and access the services of web applications platform service 111. In some embodiments, components not shown in FIG. 1 may also exist.

Figure 2:
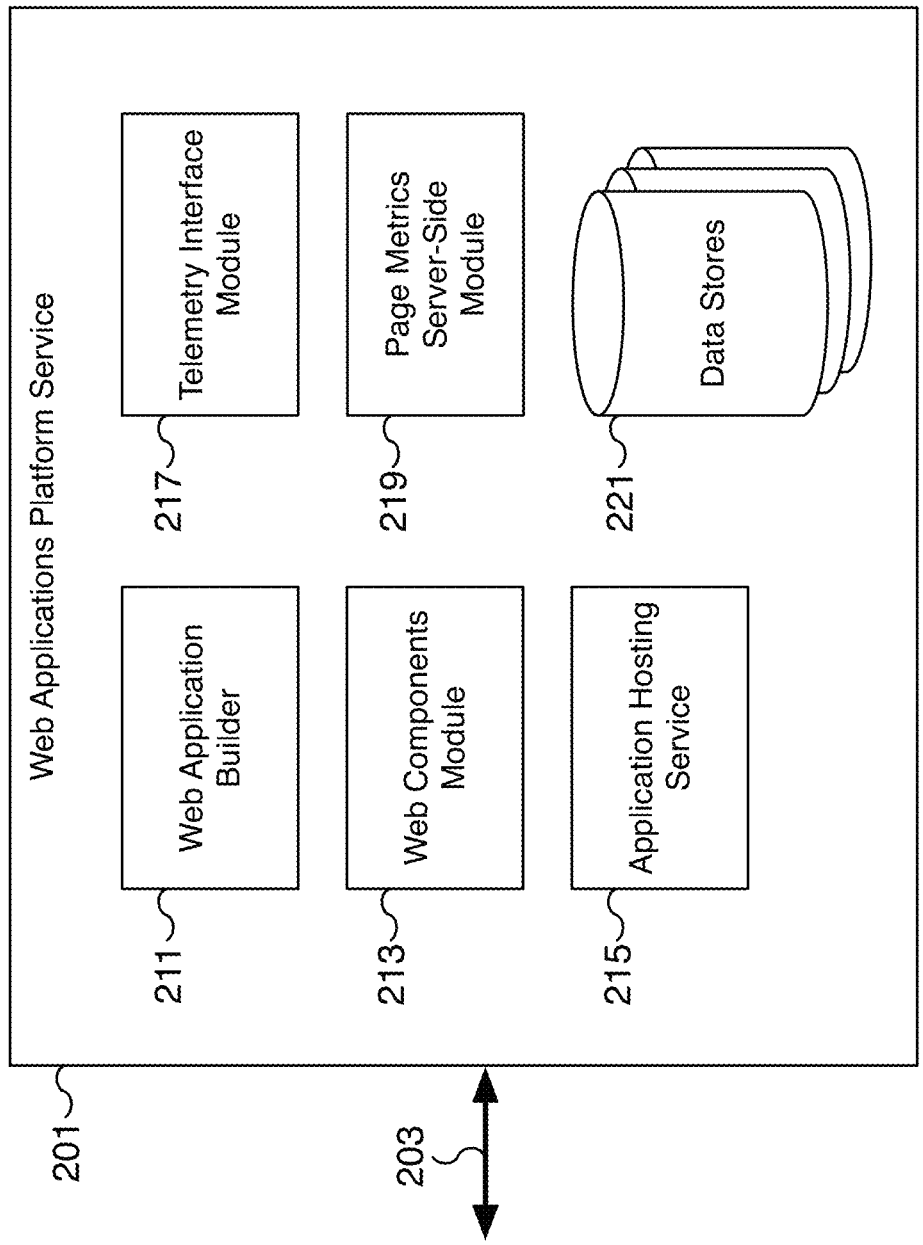
FIG. 2 is a block diagram illustrating an embodiment of a web application platform service.

FIG. 2 is a block diagram illustrating an embodiment of a web application platform service. In the example shown, web applications platform service 201 is a cloud-based service for creating and hosting web applications. The created and hosted applications can be instrumented to accurately collect relevant telemetry information such as page load time. Web applications platform service 201 communicates with remote clients via network connection 203 and includes multiple processing modules including web application builder 211, web components module 213, application hosting service 215, telemetry interface module 217, page metrics server-side module 219, and data stores 221. In some embodiments, web applications platform service 201 is web applications platform service 111 of FIG. 1. In some embodiments, the clients accessing and utilizing the services of web applications platform service 201 include clients 101, 103, and/or 105 of FIG. 1.

In some embodiments, web applications platform service 201 includes multiple processing modules for creating and hosting web applications and for instrumenting web applications to capture telemetry information. In various embodiments, one or more of the modules shown may not exist and/or additional modules may exist. In some embodiments, the functionality of one or more of the modules may be merged into a single module or split out across multiple different modules. In some embodiments, web applications platform service 201 is implemented by one or more cloud servers and one or more data stores such as one or more databases including distributed databases.

In some embodiments, web application builder 211 provides a customizable graphical user interface builder for web applications. The functionality of web application builder 211 includes the ability to create a web application using reusable components. Web application builder 211 allows a developer to select and specify the components to utilize. The developer can further specify how the utilized components are linked together along with their corresponding functionality and presentation configuration. For example, a web application can be configured to utilize one or more different presentation formats such as a single column, a double column, a triple column, a page with a left-side panel, a page with a right-side panel, a page with two side panels, and/or another presentation format. Additional presentation formats and/or behaviors, such as a grid and/or adaptive layout formats and behaviors, can be configured as well. In some embodiments, web application builder 211 further generates at least a portion of the webpage computer code associated with a created web application. The included portions of the generated webpage computer code may incorporate components including code for linking components to one another and/or a code execution scheduler for executing components.

In some embodiments, web components module 213 is utilized to provide component related functionality for web applications. For example, web components module 213 can provide a list of available components for use in a web application. In some embodiments, web components module 213 provides access to one or more component libraries. Example components made available can include an action bar, an activity stream, an agent inbox, an agent chat, an alert, an analytics key performance indicator (KPI), an audio player, and a button, among other components. In some embodiments, web components module 213 is utilized to generate metadata related to utilized components including the ability to write component-related metadata and/or to parse previously generated metadata. Web components module 213 may also be used to help retrieve utilized components including those referenced in metadata.

In some embodiments, each component can be configured with one or more properties such as prioritization and loading properties. For example, the utilized components in a web application configured using web application builder 211 can be configured with different priority parameters that determine their order and/or priority when loading the web application. In some embodiments, higher priority components are configured to be loaded first while components with low, non-critical, and/or on-demand priority configurations can be loaded last and/or loaded only when needed or the page is otherwise idle. In various embodiments, web components module 213 provides the functionality to associated component parameters and properties with components. In some embodiments, web components module 213 can generate at least a portion of the webpage computer code such as the portions associated with components for a web application created using web application builder 211.

In some embodiments, application hosting service 215 provides functionality for hosting a web application created using web application builder 211. For example, application hosting service 215 can function as an interface for providing the generated web application computer code to a client as well as provide tools for deploying, managing, and operating the web application. In some embodiments, application hosting service 215 provides functionality related to running the server-side portion of a web application including functionality related to scalability, performance, security, management, and/or operations of the web application.

In some embodiments, telemetry interface module 217 provides an interface such as an endpoint for a web-based telemetry application programming interface (API). For example, telemetry API calls originating from a client can be processed by telemetry interface module 217 to report, retrieve, collect, transmit, process, and/or provide telemetry information. As one specific example, telemetry interface module 217 can process provided timestamps for determining a page load time for a web application. As yet another specific example, telemetry interface module 217 can process resource metrics measured by a client application to provided telemetry information related to resource usage by a web application. In some embodiments, telemetry interface module 217 provides the analyzed and processed telemetry information to users such as via a visual telemetry dashboard, log files, database entries, and/or another telemetry information interface.

In some embodiments, page metrics server-side module 219 provides server-side functionality for determining page metrics including metrics such as page load times, page idle times, page latency, time on page, page focus regions, page views, page clicks, etc. In various embodiments, page metrics server-side module 219 interfaces with telemetry interface module 217 such as to implement additional processing and/or analysis for telemetry information specific to webpage metrics. For example, page metrics server-side module 219 may receive via telemetry interface module 217 a timestamp calculated at a client that corresponds to the time a webpage completes its loading at the client. Based on the received timestamp, page metrics server-side module 219 can determine a page load time using additional reference data such as when the corresponding page was requested by the client.

In some embodiments, data stores 221 are one or more data stores used by web applications platform service 201 and its components such as by web application builder 211, web components module 213, application hosting service 215, telemetry interface module 217, and page metrics server-side module 219. For example, reusable components for building web applications may be stored at data stores 221 and may be accessed by web application builder 211 and components module 213. The same components may also be retrieved by web applications hosted by application hosting service 215 when accessed by clients. In various embodiments, telemetry information can be stored at data stores 221. Other web application data including component metadata can be stored at and/or retrieved from data stores 221.

For example, component metadata for a web application can be retrieved from data stores 221 when a hosted application is accessed. In some embodiments, data stores 211 include one or more databases including distributed and/or remote databases. In various embodiments, web applications platform service 201 further stores configuration and management settings for web applications and/or their clients at data stores 221.

Figure 3:
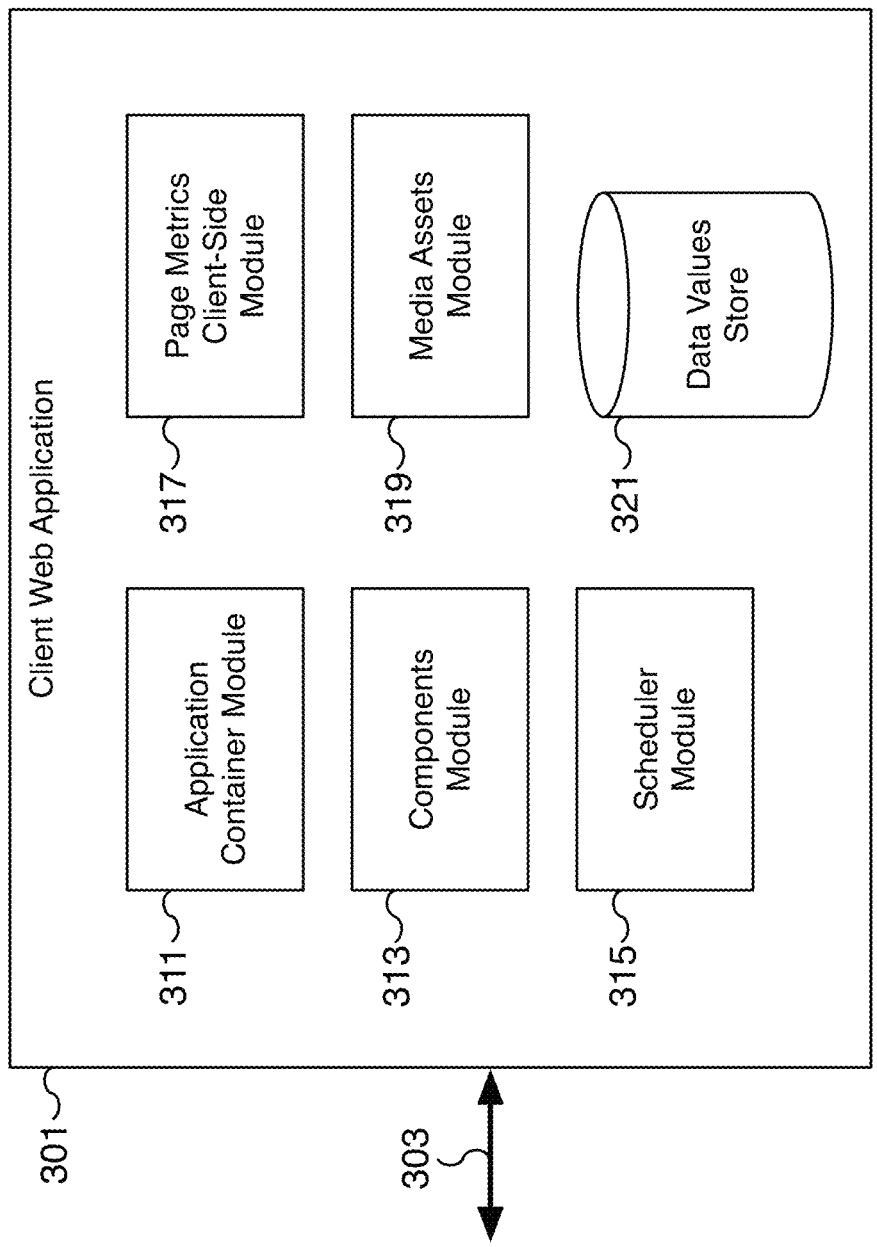
FIG. 3 is a block diagram illustrating an embodiment of a client web application.

FIG. 3 is a block diagram illustrating an embodiment of a client web application. In the example shown, client web application 301 corresponds to the client-side portion of an example web application created using a component-based web application builder. Client web application 301 communicates with a web application platform service via network connection 303 and can be instrumented to accurately collect relevant telemetry information such as page load time. In some embodiments, client web application 301 displays the modules used by a client browser for implementing the client-side functionality of a component-based web application. The corresponding webpage computer code used to implement client web application 301 can be provided by the same web application platform service. In the example shown, client web application 301 includes multiple modules including application container module 311, components module 313, scheduler module 315, page metrics client-side module 317, media assets module 319, and data values store 321. In some embodiments, client web application 301 is created and hosted by web applications platform service 111 of FIG. 1 and/or web applications platform service 201 of FIG. 2. In some embodiments, the web application builder used to create client web application 301 is web application builder 211 of FIG. 2 and client web application 301 is hosted by application hosting service 215 of FIG. 2. In some embodiments, the clients accessing client web application 301 include clients 101, 103, and/or 105 of FIG. 1.

In some embodiments, client web application 301 includes multiple modules that correspond to functional and/or data modules for implementing a web application and for collecting telemetry information for the web application. In various embodiments, one or more of the modules shown may not exist and/or additional modules may exist. In some embodiments, the functionality of or data stored in one or more of the modules may be merged into a single module or split out across multiple different modules. In some embodiments, additional modules of client web application 301 that are not shown may exist including modules common to web browsing technologies.

In some embodiments, application container module 311 is utilized to encapsulate an application including its corresponding computer code and metadata related to the application. In some embodiments, the application container module 311 corresponds to the received computer code and/or related component metadata for a web application and is processed by the web browser. For example, the application container can describe the application layout, its containers, and how they interface, and can include properties of the containers including their metadata. In some embodiments, the webpage computer code of application container module 311 can be executed by a browser engine of the web browser.

In some embodiments, components module 313 is utilized to extract container information from the web application including from component metadata. For example, components module 313 may include computer code for extracting the components utilized by the web application and their properties including their configured priority properties. The extracted properties can be used to determine how and what order to download and execute the referenced components. For example, high priority components can be retrieved and executed first while the loading of the non-critical components can be delayed until the corresponding webpage is idle.

In some embodiments, scheduler module 315 implements scheduler functionality for evaluating the execution of components. For example, scheduler module 315 may include a code execution scheduler that determines which components to execute and whether pending tasks for components remain to be executed. In some embodiments, scheduler module 315 includes a code execution scheduler for executing the components and/or for reporting the execution progress of program components. In various embodiments, scheduler module 315 may utilize one or more scheduling queues to prioritize the components of the web application. Based on the state of the scheduling, a determination can be made whether the page has completed loading, the page is idle, the user interface of the page is interactive, and/or whether the page has completed loading based on the satisfaction of an achievement of a threshold loading state.

In some embodiments, page metrics client-side module 317 is a module for performing the client-side functionality related to page metrics. For example, page metrics client-side module 317 may include a client-slide functionality and/or client-stub for telemetry application programming interface calls. Example calls can include API calls related to page load times, page idle times, page latency, time on page, page focus regions, page views, page clicks, etc. In various embodiments, page metrics client-side module 317 can interface with the server-side portion of the page metrics via a telemetry interface of a web applications platform service.

In some embodiments, media assets module 319 is utilized to reference media assets used by the web application. In some embodiments, the actual assets are stored and/or managed by the browser and/or stored in data values store 321. Media assets can include images, video, audio, and/or other media assets used by the webpage including dynamically generated assets such as graphs and charts.

In some embodiments, data values store 321 is utilized to store data values used by the web application. The data values can correspond to variables that are persistent or semi-persistent during the execution of the web application. In some embodiments, the data values stored in data values store 321 have corresponding values stored in a server-side database and are cached at data values store 321 for performance reasons. For example, in some embodiments, component metadata parameters may be stored in data values store 321 and can be updated when the metadata at the web application platform service changes.

Figure 4:
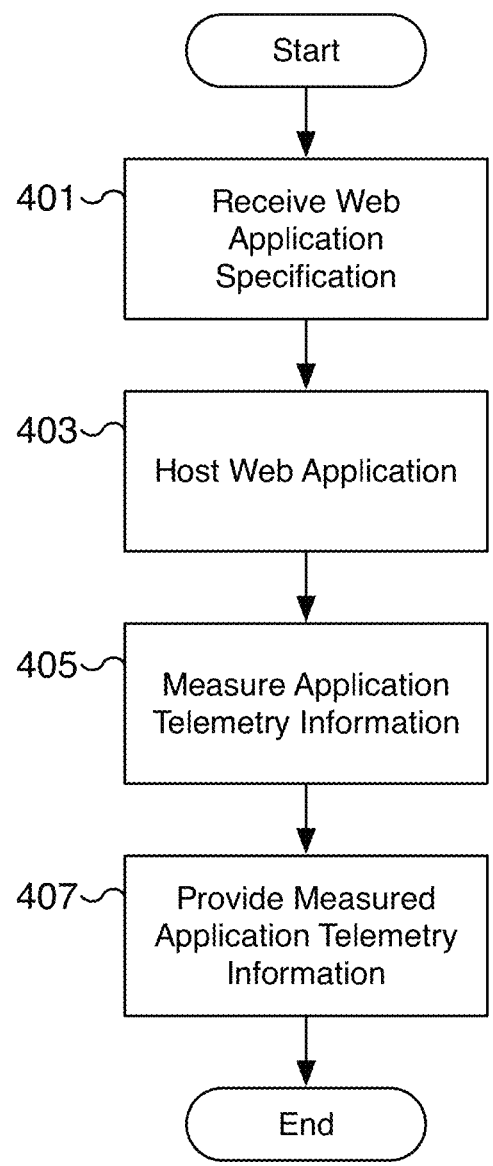
FIG. 4 is a flow chart illustrating an embodiment of a process for providing a web application with telemetry information.

FIG. 4 is a flow chart illustrating an embodiment of a process for providing a web application with telemetry information. For example, using the process of FIG. 4, a web application can be created, and the created application can be configured to report telemetry information including page load times. The application can be created using a component-based web application builder and hosted by an application hosting service. In some embodiments, the server-side portions of the web application including the creation and hosting of the web application and the support for telemetry services used for the web application correspond to web applications platform service 111 of FIG. 1 and/or web applications platform service 201 of FIG. 2. In some embodiments, at least part of the client portions of the web application correspond to client web application 301 of FIG. 3.

At 401, a web application specification is received. For example, the specification for a web application is received. In various embodiments, the specification can be generated using a customizable user interface builder to select and configure the components to use for the web application. Example components can include an action bar, an activity stream, an agent inbox, an agent chat, an alert, an analytics key performance indicator (KPI), an audio player, and a button, among other components. In various embodiments, the specifications can include configuration settings such as settings related to loading and executing each component including prioritization values. Other configuration settings can include component resource utilization schemes, component event triggers, component data persistence settings, component sharing properties, component security settings, etc. The selected components may be sourced from a shared component library and the configured web application can be stored including by storing the configured component metadata. The web application can be configured to measure and report telemetry data including utilizing a telemetry application programming interface (API) hosted by the web applications platform service.

At 403, a web application is hosted. For example, the created application is deployed and hosted to provide access to clients. In some embodiments, corresponding telemetry services utilized by the web application are also hosted along with traditional web application hosting services. For example, requests utilizing a web-based telemetry application programming interface (API) are supported by a telemetry service hosted by the web applications platform service. In various embodiments, the hosting of the web application includes providing the hardware and software infrastructure to deploy and operate the web application specified at 401.

At 405, application telemetry information is measured. For example, page metrics, resource metrics, and/or other telemetry information related to the web application are measured. In some embodiments, the telemetry measurements and reporting of the measured values are initiated by application programming interface (API) calls in the webpage computer code and portions of the telemetry processing are performed at both the client and the web applications platform service. For example, calls into a telemetry API can be utilized by the webpage to collect telemetry information required to determine page load times and page idle times. The collected telemetry information can be provided to the web applications platform service for additional telemetry processing. In some embodiments, the collected telemetry data is used to trigger events that initiate additional processing such as the loading and execution of non-critical components.

At 407, the measured application telemetry information is provided. For example, the telemetry information measured at 405 is provided to users by the web applications platform service. In various embodiments, a dashboard, log files, telemetry database entries, a telemetry application programming interface (API), and/or another interface can be used to provide the collected telemetry information. For example, in some embodiments, developers can access a telemetry dashboard to review tracked telemetry information, such as page load times, to optimize and reconfigure a corresponding web application.

Figure 5:
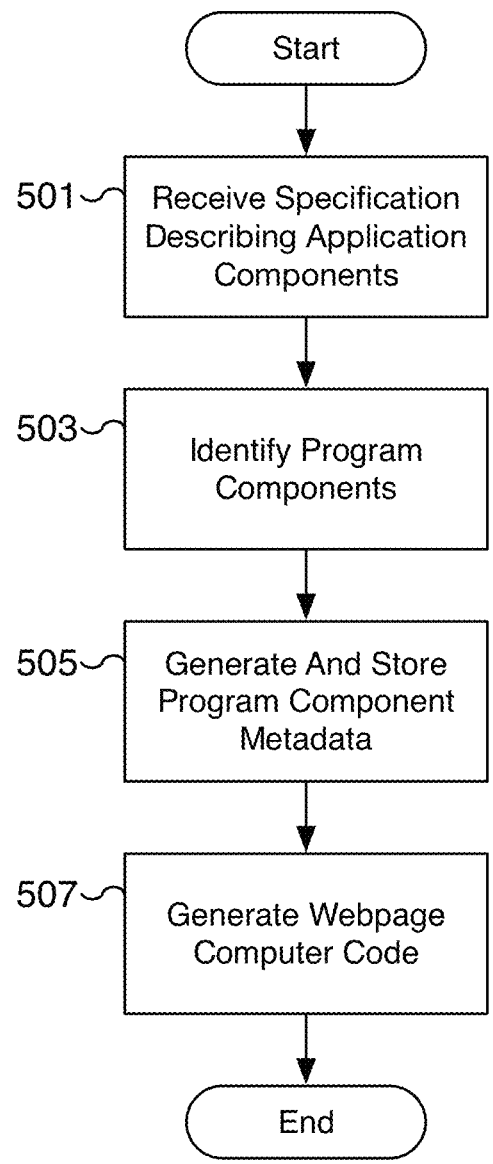
FIG. 5 is a flow chart illustrating an embodiment of a process for deploying a web application with telemetry information.

FIG. 5 is a flow chart illustrating an embodiment of a process for deploying a web application with telemetry information. For example, using the process of FIG. 5, a web application can be created, and the deployed application can be configured to report telemetry information including page load times. In some embodiments, the web application is created using a customized graphical user interface builder that allows a user to select and configure components to create the web application. For example, instead of writing computer programming code, the web application can be created using a low-code or no-code development framework that provides reusable and modular components with functional and presentation properties. In some embodiments, the process of FIG. 5 is performed at 401 and/or 403 of FIG. 4 using a web applications platform service. In some embodiments, the web applications platform service is web applications platform service 111 of FIG. 1 and/or web applications platform service 201 of FIG. 2.

At 501, a specification describing application components is received. For example, using a customized graphical user interface builder, components are selected and configured for the web application to generate a web application specification. The specification received at 501 describes the selected components and their corresponding configurations including configured component parameters related to loading and executing the component among other component parameters. Example parameters can include one or more execution priority parameters with values such as high, medium, low, critical, non-critical, and/or on-demand values, among other appropriate values. Other parameters for components can include resource utilization schemes, component event triggers, component update preferences, etc. The received specification can further include telemetry information requirements such as a request to report the page load time of the web application, the length of time until the web application is idle once access is requested, and/or the length of time before the web application is interactive for the client user.

At 503, program components are identified. For example, the components used by the web application and described in the specification received at 501 are identified. The identified components can be reusable and modular components shared by other web applications. The components may be sourced from a shared component library and can be identified by an assigned unique identifier. In various embodiments, the identified components are required for implementing the web application including the required functionality of the components and any corresponding presentation settings.

At 505, component metadata is generated and stored. For example, component metadata is generated to describe the selected components and their corresponding configurations. The generated component metadata can be used to create the web application at least in part by retrieving the referenced components at the client, invoking them with the configured properties within the client browser, and linking them as configured. The generated component metadata can be stored and provided to clients along with and/or as part of the webpage computer code for the web application. In various embodiments, the generated component metadata is stored in a database associated with the web applications platform service. In some embodiments, the generated component metadata includes layout model information, composition information, data information, and/or internal mapping information of the web application and its components. The generated component metadata associated with components used by the web application can include priority information such as page load priority parameters utilized during the loading and execution of components. Other generated component metadata can include parameters for the components related to resource utilization schemes, component event triggers, component update preferences, etc.

At 507, webpage computer code is generated. For example, computer code for the web application is generated that links and references the selected components. The generated computer code can be customized to implement the configured components including their configured functionality and presentation properties. In some embodiments, the generated computer code includes a scheduler for execution on the client browser. The scheduler can monitor and analyze the execution progresses of the referenced components, tracking the time of their execution and/or their completion. In various embodiments, the generated code is generated for the web application and/or webpages of the web application. In some embodiments, the entire web application is functionally a single webpage and/or accessible from a web address, and the webpage computer code corresponds to the computer code for the web application. In various embodiments, the generated webpage computer code includes invocations or calls to telemetry functionality such as telemetry application programming interface (API) calls to implement the configured telemetry reporting requirements. In some embodiments, the generated webpage computer code includes client-side functionality to capture telemetry information such as timestamps, resource utilization, user interaction patterns, and client information including client identifiers, session identifiers, and web application properties such as a web application version number. The generated web application code can be stored and provided for access to clients and/or the webpage computer code can be generated and provided on demand. In some embodiments, the generated webpage computer code includes and/or retrieves at least a portion of the component metadata generated at 505. For example, the component metadata generated at 505 can be retrieved from a database and included in the generated webpage computer code.

Figure 6:
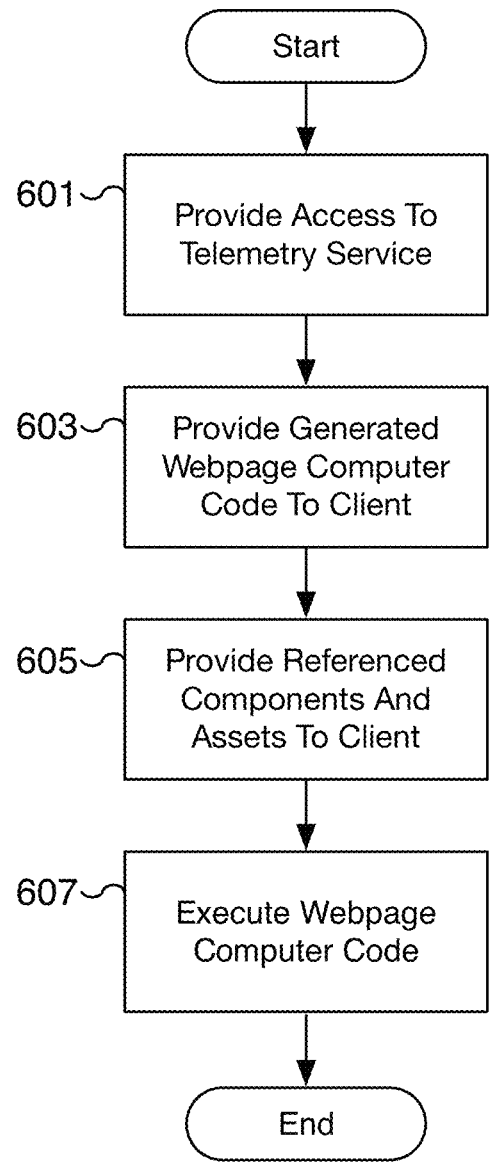
FIG. 6 is a flow chart illustrating an embodiment of a process for providing web application telemetry information.

FIG. 6 is a flow chart illustrating an embodiment of a process for providing web application telemetry information. For example, using the process of FIG. 6, telemetry information can be collected for a deployed web application. The collected telemetry information can include page metrics such as page load times, page idle times, page latency, time on page, page focus regions, page views, and page clicks, among other telemetry information including non-page metrics information. In some embodiments, the process of FIG. 6 is performed at 403, 405, and/or 407 of FIG. 4. In some embodiments, the web application and the telemetry services are hosted and/or provided by a web applications platform service. In some embodiments, the web applications platform service is web applications platform service 111 of FIG. 1 and/or web applications platform service 201 of FIG. 2.

At 601, access to a telemetry service is provided. For example, access for a web application client to a telemetry application programming interface (API) or similar telemetry service is provided. In various embodiments, the telemetry service allows the web application to provide and/or respond to telemetry information. For example, the telemetry service can be used by the web application client to provide collected telemetry information including time stamps and resource usage data. In some embodiments, the telemetry service is implemented using a telemetry interface module such as telemetry interface module 217 of FIG. 2. Access to the telemetry service can be configured and granted based on client properties such as the client's address, credentials, and/or another form of authentication such as an API key.

At 603, generated webpage computer code for the web application is provided to the client. For example, at 603, webpage computer code corresponding to the web application is provided to the client. In some embodiments, the webpage computer code includes the webpage source code for implementing the web application at the client along with additional computer code for implementing the web application functionality. In various embodiments, the provided webpage computer code is provided when the web application is accessed by a client such as via a client browser. In some embodiments, one or more stub, intermediate, and/or proxy portions of a webpage associated with the web application can request the generated webpage computer code.

At 605, referenced components and assets are provided to the client. For example, the components and assets utilized by the web application are provided to the client. In some embodiments, only the critical components are provided, at least initially, and/or the referenced components and assets are provided based on configured priority settings. The referenced components and assets can be provided by the web applications platform service. In some embodiments, the provided assets include media assets such as text, images, audio, and/or video, among other assets.

At 607, the webpage computer code is executed. For example, the webpage computer code received at 603 is executed. In various embodiments, the execution of the webpage computer code loads and executes at least the components required to implement the configured required functionality of the web application. For example, in some embodiments, critical functionality can be executed while execution of non-critical functionality can be deferred until needed. The execution of the components can include the execution of telemetry functionality such as the collection and reporting of telemetry information. In various embodiments, the telemetry functionality utilizes the telemetry services for which access is provided at 601.

Figure 7:
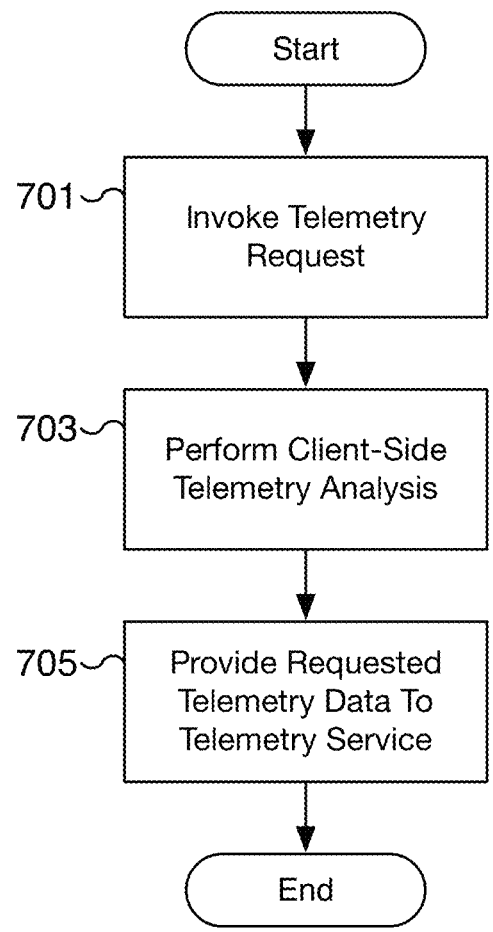
FIG. 7 is a flow chart illustrating an embodiment of a process for determining client-side telemetry information for a web application.

FIG. 7 is a flow chart illustrating an embodiment of a process for determining client-side telemetry information for a web application. For example, using the process of FIG. 7, telemetry information is collected at a client for a deployed component-based web application. Once collected, the telemetry information is provided to a telemetry service. In various embodiments, the collected telemetry information can include page metrics such as page load times, page idle times, page latency, time on page, page focus regions, page views, and page clicks, among other telemetry information including non-page metrics information. In some embodiments, the process of FIG. 7 is performed at 403, 405, and/or 407 of FIG. 4 and/or at 607 of FIG. 6 within a browser by a client of a web application. In some embodiments, the client is client 101, 103, and/or 105 of FIG. 1. In some embodiments, the corresponding server-side portion of the associated web application and telemetry services are hosted and/or provided by a web applications platform service such as web applications platform service 111 of FIG. 1 and/or web applications platform service 201 of FIG. 2.

At 701, a telemetry request is invoked. For example, a telemetry application programming interface (API) call is invoked at the client of the web application. In some embodiments, the call is to a JavaScript telemetry API included in the webpage computer code for the web application. The implementation of the telemetry API can include a client portion and a server portion. For example, a client portion can be invoked that executes within the client browser to perform client-side aspects of telemetry collection. In various embodiments, at 701, the client-side telemetry functionality is invoked.

At 703, client-side telemetry analysis is performed. For example, the client-side aspects of the telemetry functionality are performed to collect the required telemetry data at the required conditions. For example, for a request for page load time telemetry information, a timestamp is collected when the execution progress of required components has reached a threshold loading state, such as when all critical components have completed their execution. In various embodiments, the client-side aspects of telemetry functionality are implemented using client-side computer code that executes in the client browser. In some embodiments, at least a portion of the telemetry functionality is performed by a scheduler such as a code execution scheduler. Although performed at the client browser, in some embodiments, the client-side telemetry analysis can utilize functionality external to the client browser such as external telemetry services. The external services can include telemetry services offered by a third-party and/or remote server and/or local telemetry services such as telemetry functionality provided by a sensor agent running on the client device.

At 705, the requested telemetry data is provided to a telemetry service. For example, once the request telemetry data has been collected, the collected telemetry data is provided to a telemetry service. For example, a timestamp corresponding to the page load completion time is provided to a telemetry service to determine the corresponding page load time. In various embodiments, the telemetry service determines the corresponding page load time based on a start time, such as the time of the initial web application access request, and the provided telemetry data. In some embodiments, the completion of the telemetry request can further trigger an event, such as a page complete event and/or a page idle event.

Figure 8:
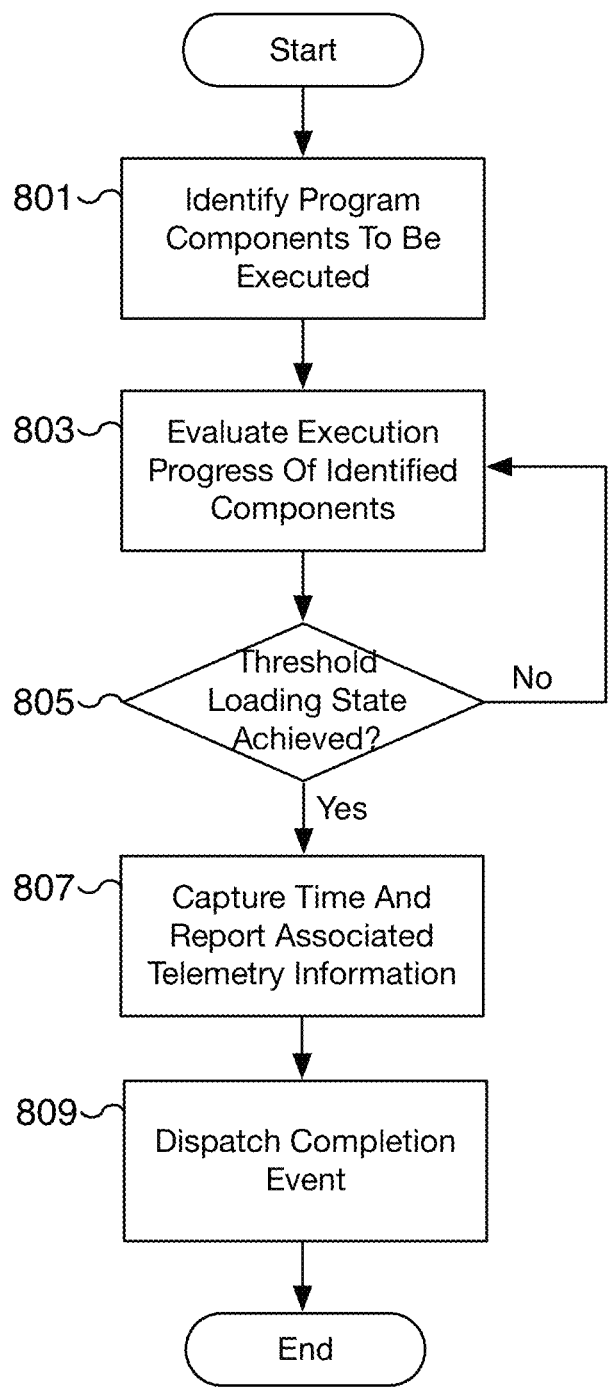
FIG. 8 is a flow chart illustrating an embodiment of a process for determining client-side page load time telemetry information for a web application.

FIG. 8 is a flow chart illustrating an embodiment of a process for determining client-side page load time telemetry information for a web application. For example, using the process of FIG. 8, page load time telemetry information is collected at a client for a deployed component-based web application. The collected page load time telemetry information can correspond to a timestamp of the time when a page has completed loading and/or when a page becomes interactive for a user. In various embodiments, once collected, the timestamp and associated telemetry information is provided to an application service such as a telemetry service to determine a page load time. In some embodiments, the process of FIG. 8 is performed at 403, 405, and/or 407 of FIG. 4, at 607 of FIG. 6, and/or at 701, 703, and/or 705 of FIG. 7 within a browser by a client of a web application. In some embodiments, the client is client 101, 103, and/or 105 of FIG. 1. In some embodiments, the corresponding server-side portion of the associated web application and telemetry services are hosted and/or provided by a web applications platform service such as web applications platform service 111 of FIG. 1 and/or web applications platform service 201 of FIG. 2.

At 801, program components to be executed are identified. For example, the program components configured for execution during a page load are identified. In some embodiments, the program components are identified based on component metadata describing the required components and their configured properties such as their load and execution properties. For example, components marked critical are identified as requiring execution at page load time while components marked non-critical or deferrable are identified as not requiring execution at page load time. Other component properties can be associated with requiring (or not requiring) execution at page load time such as certain priority levels. In some embodiments, the identified components are identified and/or tracked by a scheduler such as a code execution scheduler. In various embodiments, a listing of the program components to be executed may be obtained from provided component metadata. The provided component metadata may be retrieved from a component metadata database hosted by the web applications platform service.

At 803, the execution progress of identified components is evaluated. For example, for each component identified at 801 for execution during a page load, its execution progress is evaluated. The evaluation of a program component's execution can include determining whether the component has any pending tasks including any high or medium priority tasks that have not completed. In some embodiments, the evaluation of the execution progress of identified components includes evaluating tasks associated with system tasks such network requests. For example, a determination can be made whether any backend network requests specific to identified components are pending.

In some embodiments, the evaluation of identified components can be performed at least in part by a scheduler such as a code execution scheduler. For example, for a scheduler that utilizes an execution queue, the execution queue can be evaluated for pending tasks associated with identified components. In various embodiments, when no pending tasks exist (i.e., all required tasks have completed their execution and/or have been cleared of the execution queue), the execution progress of a component is complete. In some embodiments, an achievement of a threshold loading state is satisfied when the execution of all components identified at 801 is complete.

At 805, a determination is made whether a threshold loading state is achieved. In the event an achievement of a threshold loading state is satisfied, processing proceeds to 807. In the event an achievement of a threshold loading state is not satisfied, processing loops back to 803.

At 807, the current time is captured and associated telemetry information is reported. For example, based on the determination made at 805, the page load has completed. In response to the completion, a timestamp is calculated at a client that corresponds to the time the webpage load completes at the client. The captured timestamp along with any additional telemetry information such as client identifiers, session identifiers, web application properties such as web application version numbers, among other telemetry information is reported. The captured client identifiers can include a device identifier such as an IP address, a hostname, a network name, a MAC address, a user identifier, etc. In some embodiments, the captured timestamp and associated telemetry information are reported to a telemetry service where the page load time is calculated. For example, the page load time can be calculated by a telemetry service hosted with the web applications platform service to determine an accurate evaluation of the page load time using additional reference data such as when the corresponding page was requested by the client.

At 809, a completion event is dispatched. For example, one or more completion events can be dispatched signaling that the page load has completed. In some embodiments, a page load complete event is dispatched when the page load is complete. Additional events can also be dispatched, as appropriate. For example, other events associated with the completion of the page load may be dispatched such as a page idle event and/or a user interface active event. In various embodiments, a dispatched event can be used to launch additional processing such as loading non-essential and/or non-interactive program page components.

Figure 9:
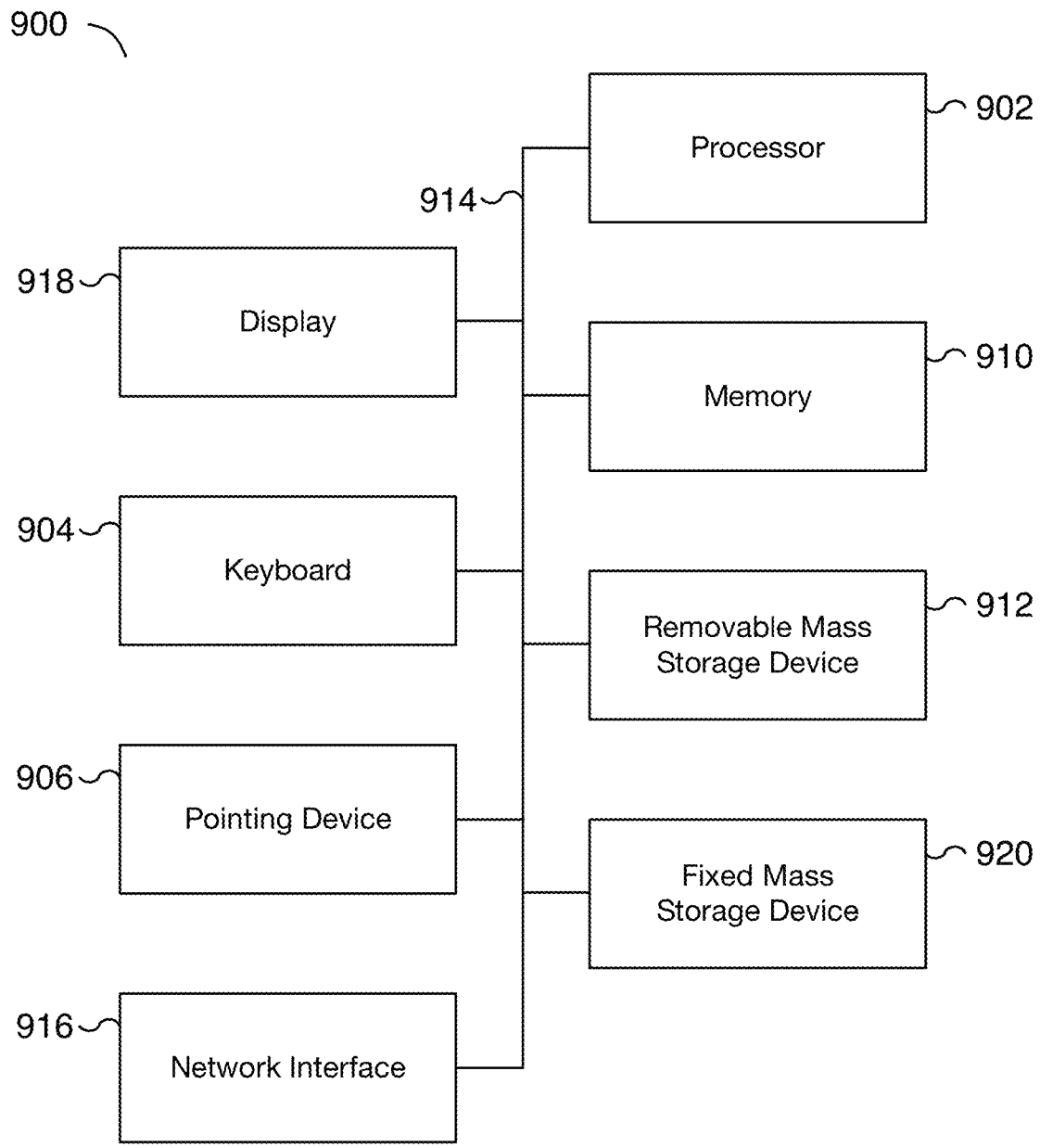
FIG. 9 is a functional diagram illustrating a programmed computer system for providing web application telemetry information.

FIG. 9 is a functional diagram illustrating a programmed computer system for providing web application telemetry information. As will be apparent, other computer system architectures and configurations can be utilized for providing web application telemetry information. Examples of computer system 900 include clients 101, 103, and 105 of FIG. 1, one or more computers of web applications platform service 111 of FIG. 1, one or more computers of web applications platform service 201 of FIG. 2, and/or the computer system associated with client web application 301 of FIG. 3. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918). In various embodiments, one or more instances of computer system 900 can be used to implement at least portions of the processes of FIGS. 4-8 and the functionality associated with the diagrams of FIGS. 10-12 and 13A-13D.

Processor 902 is coupled bi-directionally with memory 910, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data and objects used by the processor 902 to perform its functions (e.g., programmed instructions). For example, memory 910 can include any suitable computer-readable storage media, described below, depending on whether, for example, data access needs to be bi-directional or unidirectional. For example, processor 902 can also directly and very rapidly retrieve and store frequently needed data in a cache memory (not shown).

A removable mass storage device 912 provides additional data storage capacity for the computer system 900, and is coupled either bi-directionally (read/write) or unidirectionally (read only) to processor 902. For example, storage 912 can also include computer-readable media such as magnetic tape, flash memory, PC-CARDS, portable mass storage devices, holographic storage devices, and other storage devices. A fixed mass storage 920 can also, for example, provide additional data storage capacity. The most common example of mass storage 920 is a hard disk drive. Mass storages 912, 920 generally store additional programming instructions, data, and the like that typically are not in active use by the processor 902. It will be appreciated that the information retained within mass storages 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display monitor 918, a network interface 916, a keyboard 904, and a pointing device 906, as well as an auxiliary input/output device interface, a sound card, speakers, and other subsystems as needed. For example, the pointing device 906 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 9 is but an example of a computer system suitable for use with the various embodiments disclosed herein. Other computer systems suitable for such use can include additional or fewer subsystems. In addition, bus 914 is illustrative of any interconnection scheme serving to link the subsystems. Other computer architectures having different configurations of subsystems can also be utilized.

Figure 10:
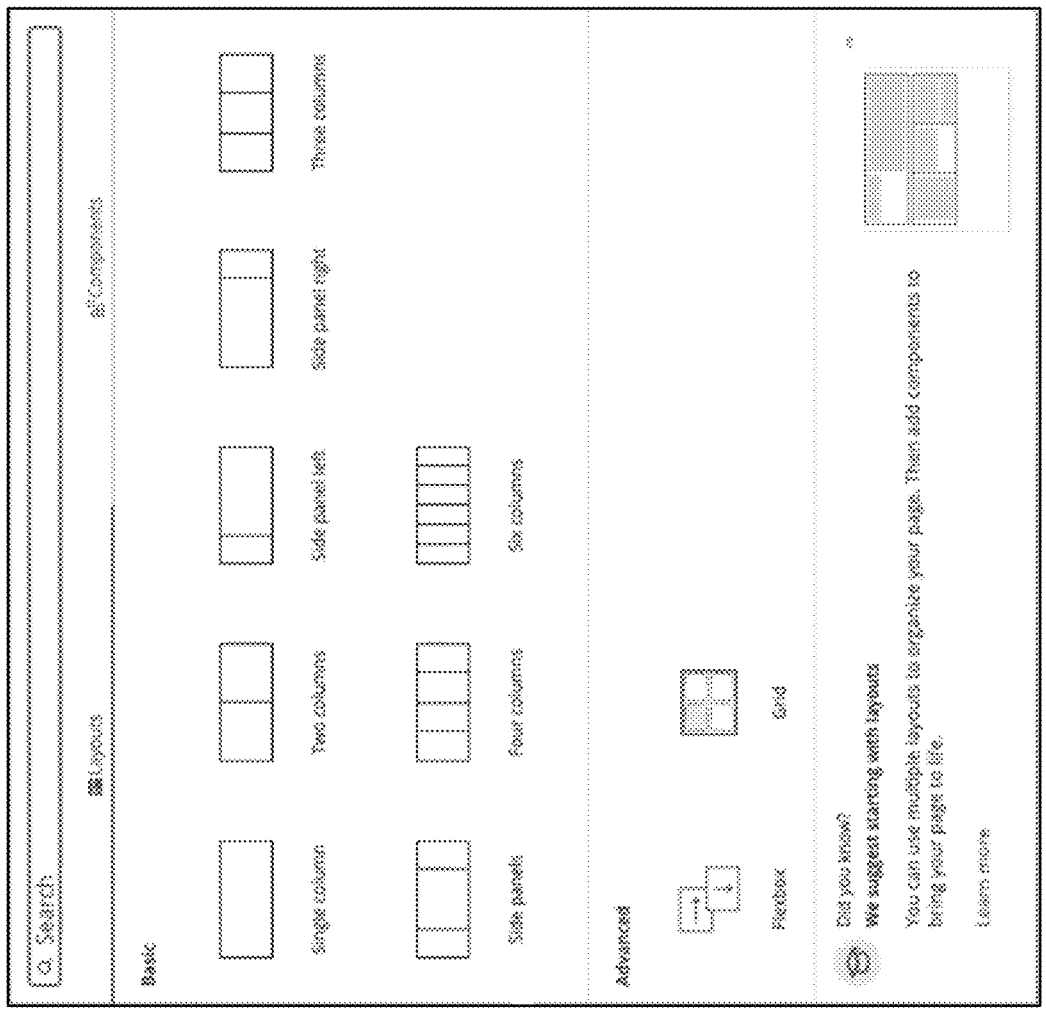
FIG. 10 is a diagram illustrating an embodiment of a user interface for configuring the layout of a component-based web application.

FIG. 10 is a diagram illustrating an embodiment of a user interface for configuring the layout of a component-based web application. In the example shown, user interface 1000 is a user interface dialog of a customizable user interface builder for selecting layout options for a custom component-based web application. The available layout options allow a user to configure the presentation format of the associated web application. In various embodiments, the selected layout options are applied to the components used by the designed web application and can be stored as component metadata. As shown in user interface 1000, the layout options include layouts with a single column, two columns, a side panel left, a side panel right, three columns, side panels, four columns, and six columns. Additional advanced layout options include flexible (also known as "Flexbox") and grid layout formats and behaviors. In various embodiments, the web application configured using the customizable user interface builder of user interface 1000 is component based and can be instrumented to capture and report web application telemetry information. In some embodiments, user interface 1000 is provided by a web application builder such as web application builder 211 of FIG. 2.

Figure 11:
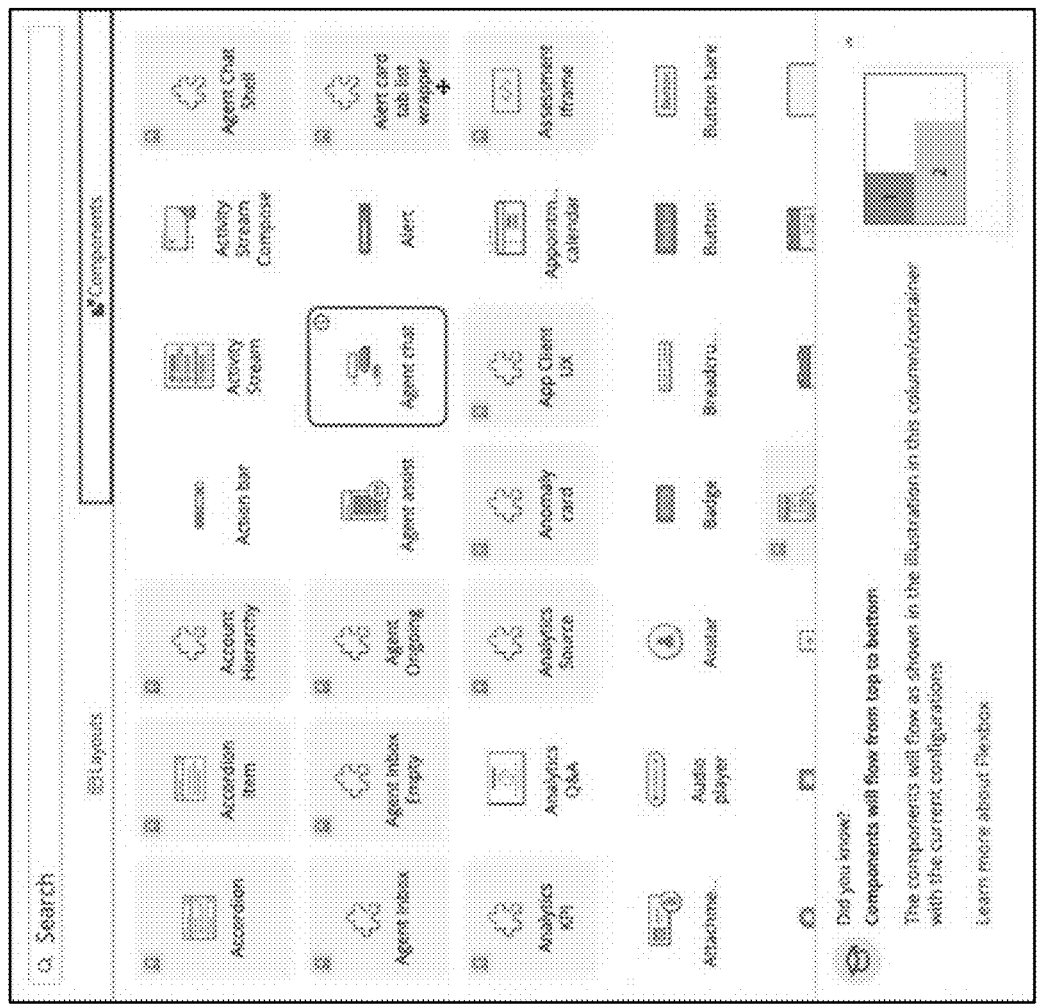
FIG. 11 is a diagram illustrating an embodiment of a user interface for configuring components of a component-based web application.

FIG. 11 is a diagram illustrating an embodiment of a user interface for configuring components of a component-based web application. In the example shown, user interface 1100 is a user interface dialog of a customizable user interface builder for selecting components for a custom component-based web application. The available components allow a user to configure the functionality and presentation of the associated web application using reusable and modular components. In various embodiments, the selected components can be stored as component metadata. As shown in user interface 1100, a variety of different components are available with the current selection showing an agent chat component. In some embodiments, once the selection of the component is confirmed, the selected component can be further configured using a subsequent user interface dialog (not shown). In various embodiments, the web application configured using the customizable user interface builder of user interface 1200 can be instrumented to capture and report web application telemetry information. In various embodiments, a user can toggle between user interface 1100 of FIG. 11 and user interface 1200 of FIG. 12. In some embodiments, user interface 1100 is provided by a web application builder such as web application builder 211 of FIG. 2.

Figure 12:
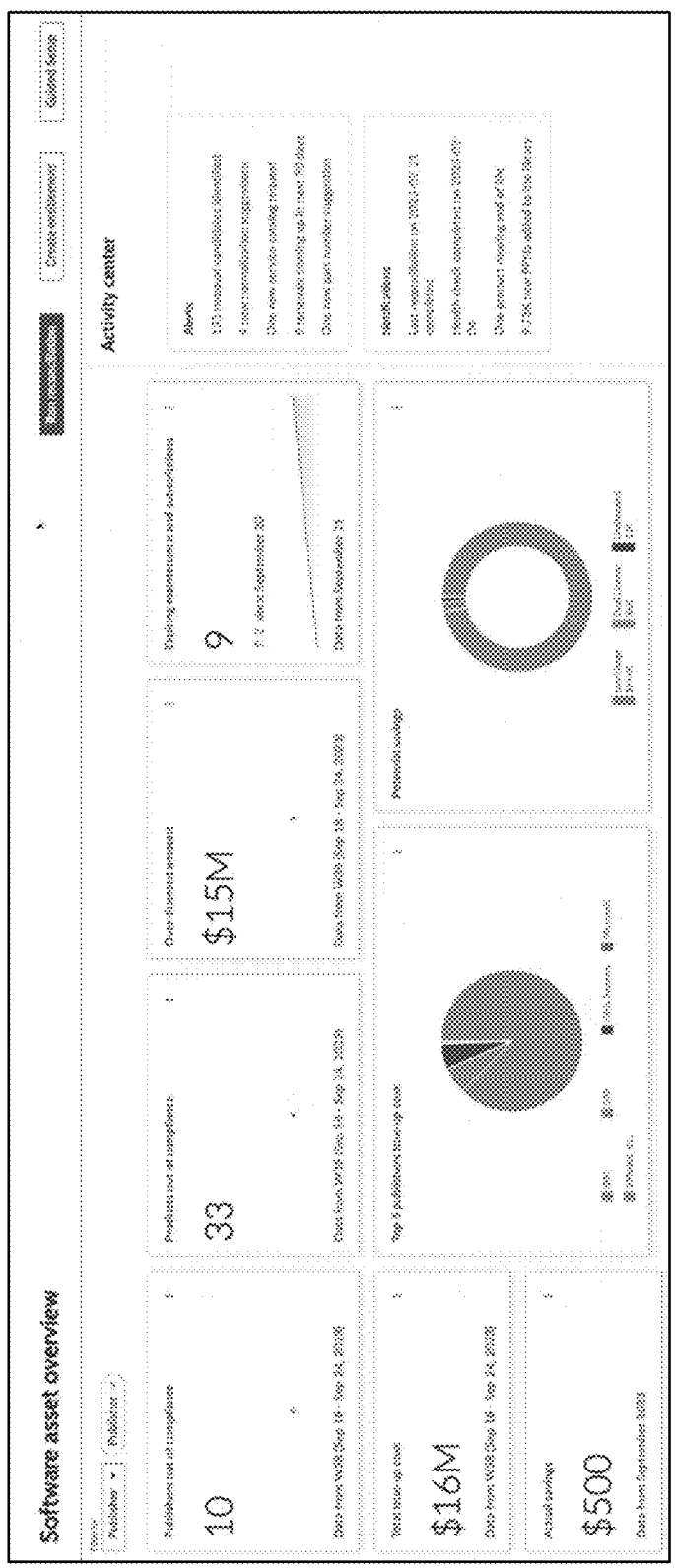
FIG. 12 is a diagram illustrating an embodiment of a user interface for a component-based web application instrumented to capture and report telemetry information.

FIG. 12 is a diagram illustrating an embodiment of a user interface for a component-based web application instrumented to capture and report telemetry information. In the example shown, user interface 1200 is a user interface view of a dashboard web application for managing software assets. User interface 1200 is created using a customizable user interface builder by selecting and configuring components to at least implement the functionality and presentation of the web application. For example, the different sections of the web application shown in user interface 1200 are implemented using different instances of web application components, such as one component to implement a "Publishers out of compliance" section and another component to implement a "Products out of compliance" section. In some embodiments, the web application of user interface 1200 is implemented using web application builder 211 of FIG. 2.

As shown in the example of user interface 1200, the layout of the associated web application is configured to utilize a central column with a side panel to its right. In various embodiments, the web application is designed using a customizable user interface builder with user interface screens for configuring the layout and the components of the application such as user interface 1100 of FIG. 11 and user interface 1200 of FIG. 12, respectively. In various embodiments, the web application of user interface 1200 is further instrumented to capture page load telemetry information. For example, the page load time of the associated webpage of user interface 1200 can be captured based on the time it takes to load the components configured to be executed during the page load. In some embodiments, the functionality of some components may be non-critical and for those components, their loading can be deferred. For example, the retrieval and/or execution of the components for implementing the functionality invoked when selecting the "Create entitlement" or "Guided Setup" buttons of user interface 1200 can be deferred until after the components for displaying the dashboard information of user interface 1200 are retrieved and executed.

In various embodiments, using the disclosed techniques herein, the properties of the components utilized for implementing user interface 1200 can be configured using different component parameter values. The different component parameter values can be used to configure the priority, loading, and/or execution behavior of user interface 1200. For example, the perceived and/or actual delay of user interface 1200 before the web application is initially interactive for a user can be optimized to prioritize the loading of critical components. In some embodiments, captured and reported telemetry information associated with the page load time of the web application can be used to optimize and/or confirm the performance of the web application including the order and timing required to load and execute necessary components prior to providing an interactive user interface for the associated web application.

Figure 13A:
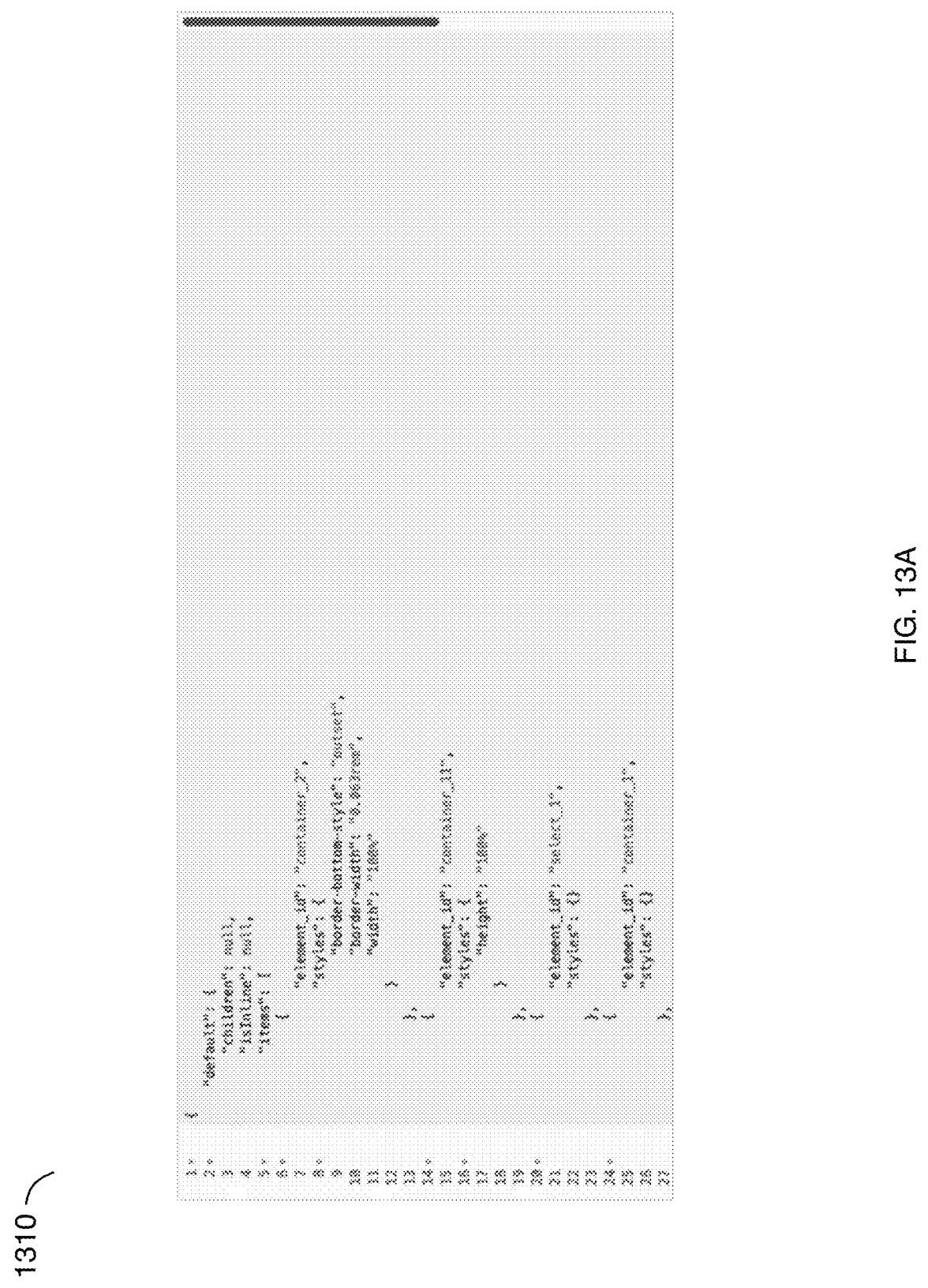
Figure 13C:
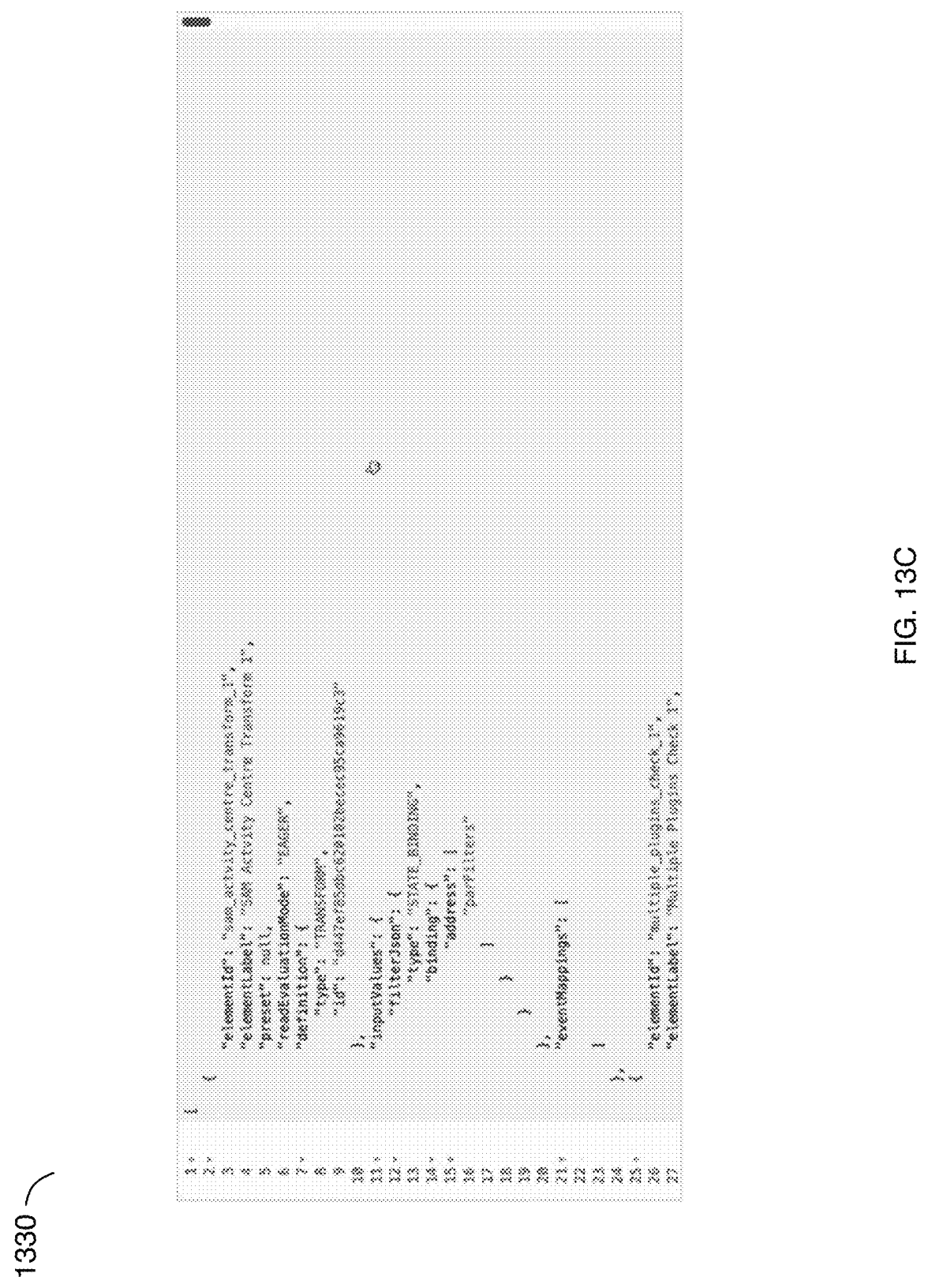

FIGS. 13A-D are diagrams illustrating portions of example component metadata. In various embodiments, component metadata are generated to record specifications for a web application including the required components and their properties using the techniques described herein. In some embodiments, the component metadata associated with FIGS. 13A-D is generated and stored in a database by a components module such as components module 313 of FIG. 3 at step 505 of FIG. 5. In some embodiments, the generated component metadata includes layout model information, composition information, data information, and/or internal mapping information of the web application and its components. In the example of FIG. 13A, component metadata excerpt 1310 displays a portion of component metadata associated with the layout model of the web application. The displayed portion of component metadata excerpt 1310 shows different components of the web application referenced by their element identifier along with layout model style parameters. In the example of FIG. 13B, component metadata excerpt 1320 displays a portion of component metadata associated with the composition of the associated web application. The displayed portion of component metadata excerpt 1320 shows component metadata related to the composition of a particular model viewport component of the web application. In the example of FIG. 13C, component metadata excerpt 1330 displays a portion of component metadata associated with the data of the associated web application. The displayed portion of component metadata excerpt 1330 shows at least component metadata related to data values for a "SAM Activity Centre Transform" component of the web application. In the example of FIG. 13D, component metadata excerpt 1340 displays a portion of component metadata associated with the internal event mapping of the associated web application. The displayed portion of component metadata excerpt 1340 shows component metadata related to internal event mapping parameters associated with the web application. In various embodiments, the composition metadata excerpts of FIGS. 13A-D utilize key-value pairs and a text-based format to describe the component metadata although other formats are appropriate as well including binary formats.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
receiving a specification of a user interface for a development of a web application associated with capturing telemetry information;
identifying program components to be executed by a client to load the user interface of the web application;
storing metadata associated with the identified program components in a database;
generating webpage computer code to be executed by the client to load the user interface, wherein execution of the webpage computer code results in determining, based on the generated webpage computer code, satisfaction of an achievement of a threshold loading state, wherein the threshold loading state characterizes the user interface executing on the client based on execution progresses of the program components; and
providing the webpage computer code to the client, wherein the satisfaction of the achievement of the threshold loading state is detected using a code execution scheduler provided via the generated webpage computer code.

2. The method of claim 1, wherein the execution of the webpage computer code further results in identifying a listing of the program components to be executed by the client by obtaining the metadata from the database.

3. The method of claim 1, wherein the code execution scheduler utilizes an execution queue.

4. The method of claim 1, wherein the webpage computer code includes client-side functionality to capture the telemetry information.

5. The method of claim 1, wherein the execution of the webpage computer code further results in determining a timestamp associated with the satisfaction of the achievement of the threshold loading state.

6. The method of claim 1, wherein the execution of the webpage computer code further results in determining a client identifier, a session identifier, or a web application version associated with the satisfaction of the achievement of the threshold loading state and the web application.

7. The method of claim 1, wherein the metadata associated with the identified program components includes layout model information, composition information, data information, or internal mapping information of the web application.

8. The method of claim 1, wherein the metadata associated with the identified program components includes page load priority parameters.

9. A system, comprising:
one or more processors; and
a memory coupled to the one or more processors, wherein the memory is configured to provide the one or more processors with instructions which when executed cause the one or more processors to:
receive a specification of a user interface for a development of a web application associated with capturing telemetry information;

identify program components to be executed by a client to load the user interface of the web application;

store metadata associated with the identified program components in a database;

generate webpage computer code to be executed by the client to load the user interface, wherein execution of the webpage computer code results in determining, based on the generated webpage computer code, satisfaction of an achievement of a threshold loading state, wherein the threshold loading state characterizes the user interface executing on the client based on execution progresses of the program components; and provide the webpage computer code to the client, wherein the satisfaction of the achievement of the threshold loading state is detected using a code execution scheduler provided via the generated webpage computer code.

10. The system of claim 9, wherein the execution of the webpage computer code further results in identifying a listing of the program components to be executed by the client by obtaining the metadata from the database.

11. The system of claim 9, wherein the webpage computer code includes client-side functionality to capture the telemetry information.

12. The system of claim 9, wherein the execution of the webpage computer code further results in determining a timestamp associated with the satisfaction of the achievement of the threshold loading state.

13. The system of claim 9, wherein the execution of the webpage computer code further results in determining a client identifier, a session identifier, or a web application version associated with the satisfaction of the achievement of the threshold loading state and the web application.

14. The system of claim 9, wherein the metadata associated with the identified program components includes layout model information, composition information, data information, or internal mapping information of the web application.

15. The system of claim 9, wherein the metadata associated with the identified program components includes page load priority parameters.

16. A computer program product, the computer program product being embodied in a non-transitory computer readable storage medium and comprising computer instructions for:

receiving a specification of a user interface for a development of a web application associated with capturing telemetry information;

identifying program components to be executed by a client to load the user interface of the web application;

storing metadata associated with the identified program components in a database;

generating webpage computer code to be executed by the client to load the user interface, wherein execution of the webpage computer code results in determining, based on the generated webpage computer code, satisfaction of an achievement of a threshold loading state, wherein the threshold loading state characterizes the user interface executing on the client based on execution progresses of the program components; and providing the webpage computer code to the client, wherein the satisfaction of the achievement of the threshold loading state is detected using a code execution scheduler provided via the generated webpage computer code.

17. The computer program product of claim 16, wherein the execution of the webpage computer code further results in identifying a listing of the program components to be executed by the client by obtaining the metadata from the database.

18. The computer program product of claim 16, wherein the webpage computer code includes client-side functionality to capture the telemetry information.

19. The computer program product of claim 16, wherein the execution of the webpage computer code further results in determining a timestamp associated with the satisfaction of the achievement of the threshold loading state.

20. The computer program product of claim 16, wherein the metadata associated with the identified program components includes page load priority parameters.

* * * * *